Aug. 14, 1945.    J. W. RADU    2,382,256
DIAMOND CUTTING MACHINE
Filed Sept. 21, 1943    4 Sheets-Sheet 3
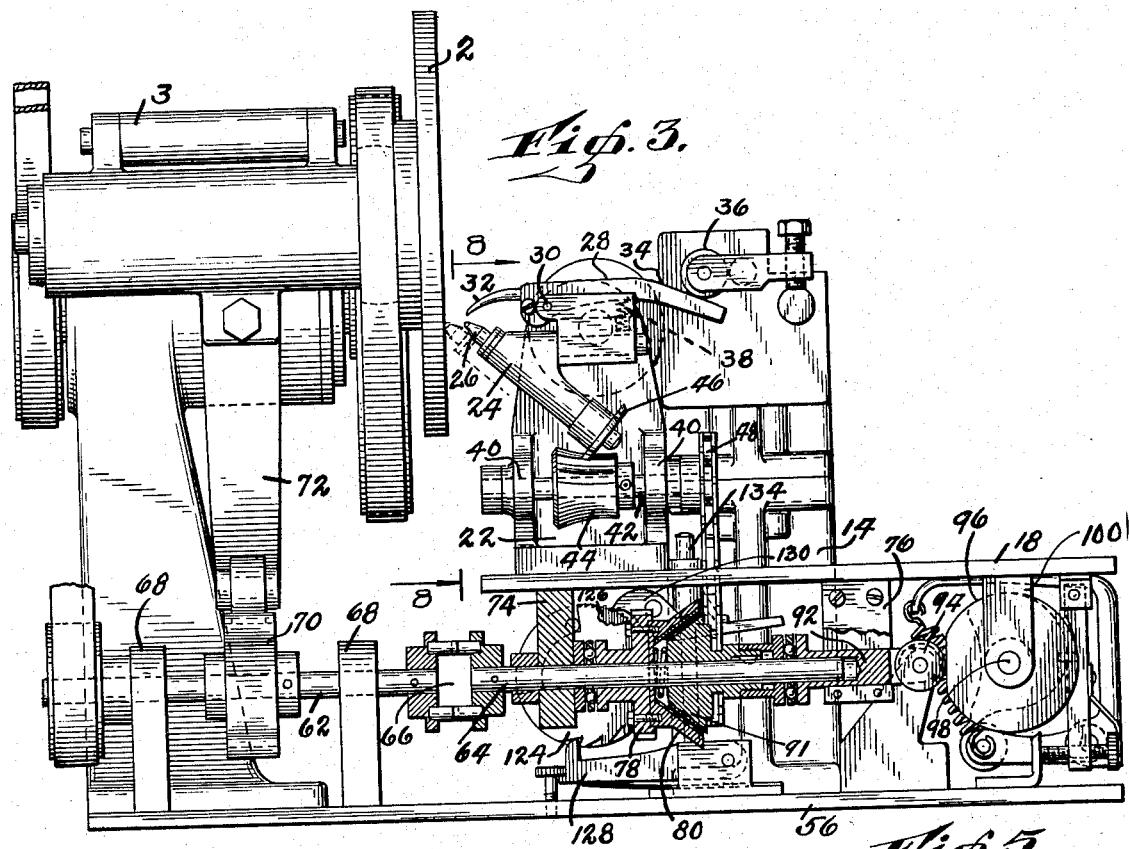
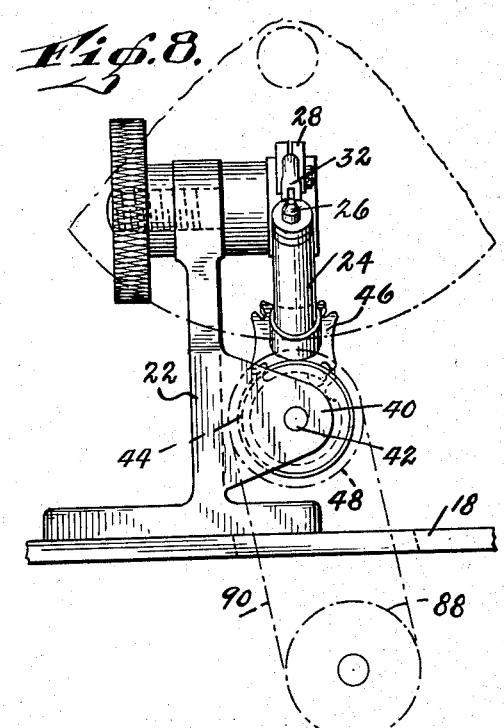
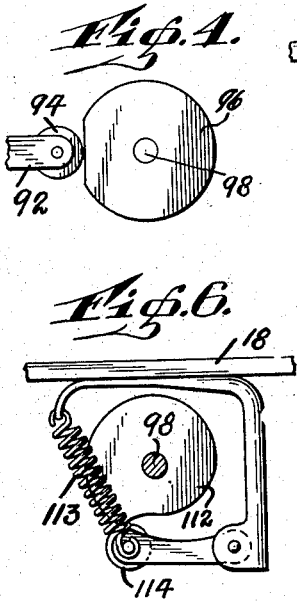
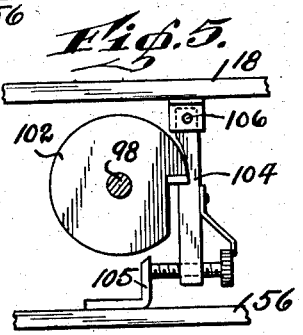
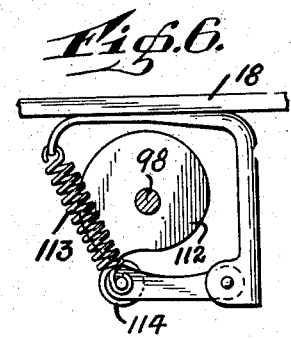
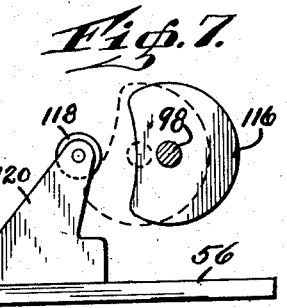
INVENTOR
John W. Radu.
BY James G. Bethell
ATTORNEY

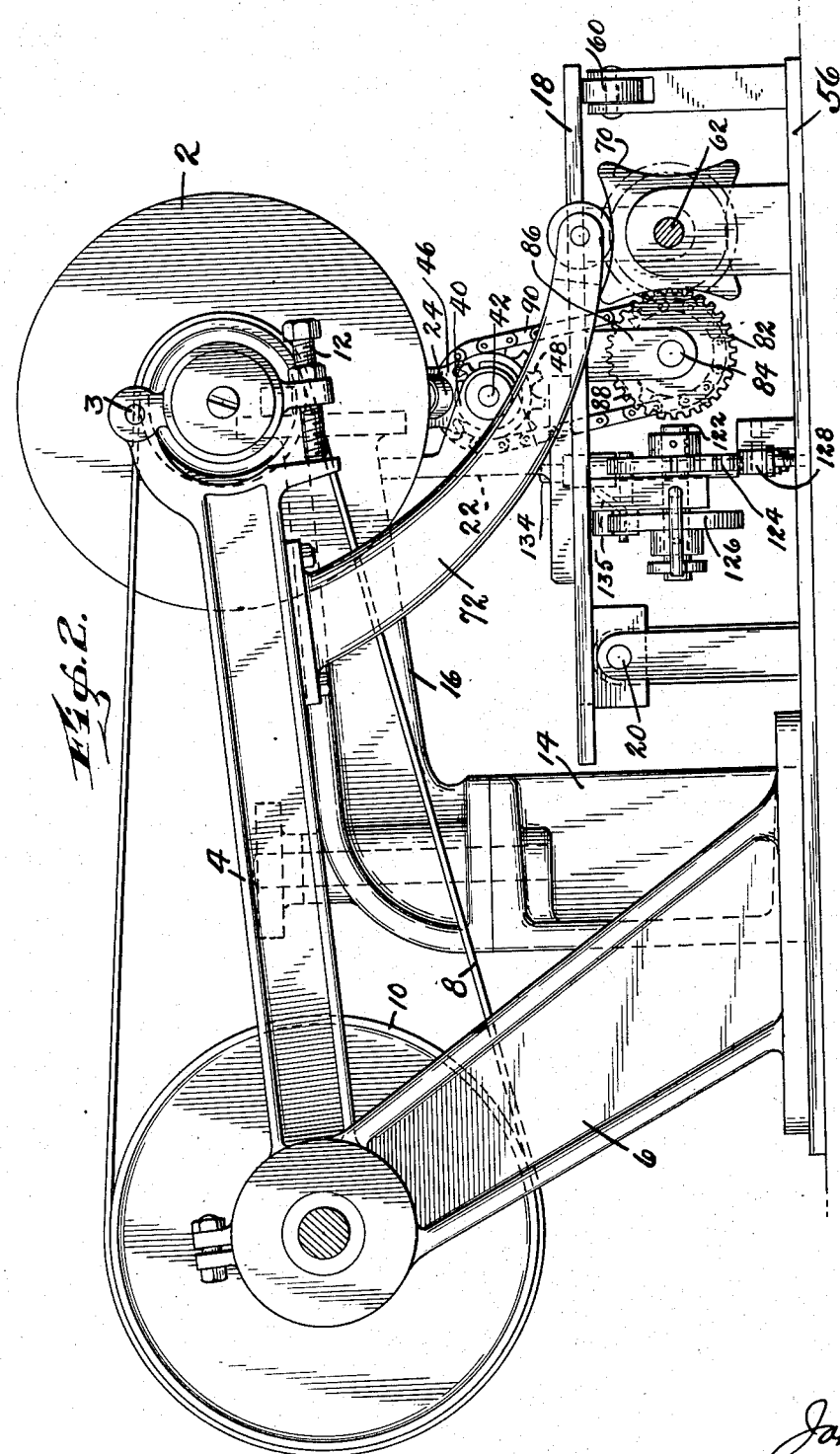

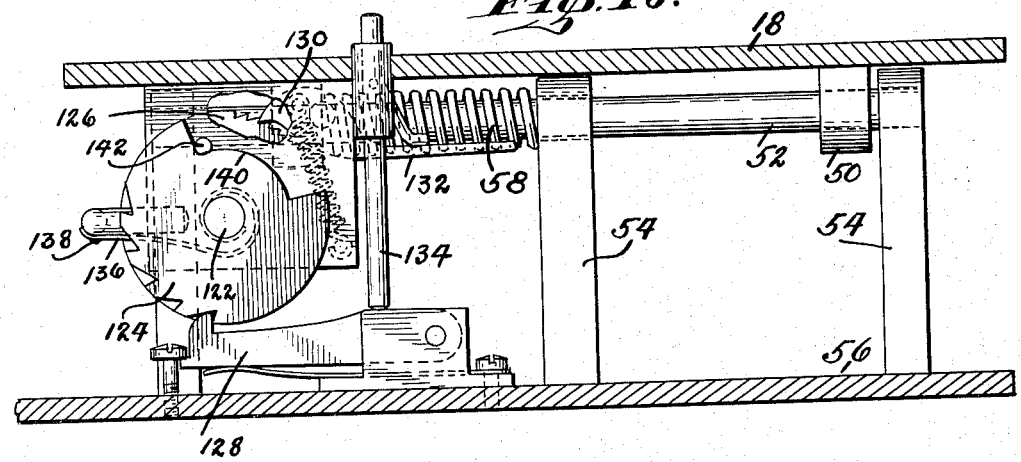
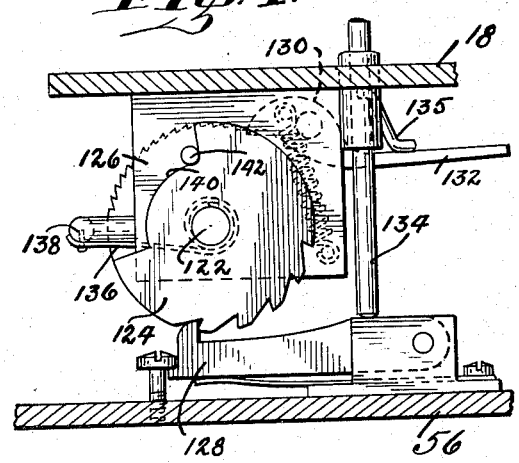
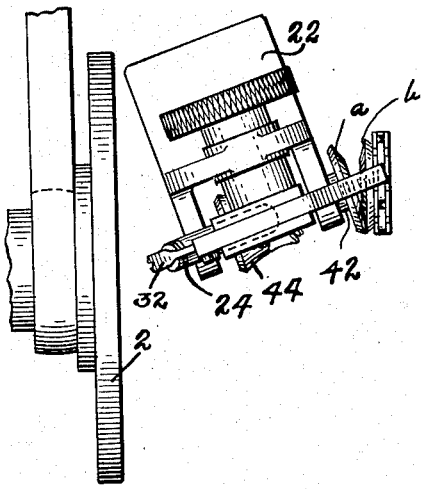
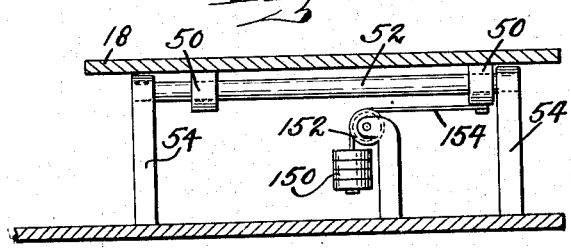

UNITED STATES PATENT OFFICE 2,382,256

DIAMOND CUTTING MACHINE

John W. Radu, New York, N. Y., assignor to Harry Winston, Inc., New York, N. Y., a corporation of New York Application September 21, 1943, Serial No. 503,223

11 Claims. (Cl. 51—55)

This invention relates to a machine for cutting diamonds and has for one of its objects to provide such a machine which is relatively simple in construction and in operation and whereby diamonds may be cut with the maximum of speed and accuracy.

Another object of my invention is to provide a machine for cutting diamonds with the maximum of speed and accuracy wherein the necessity of employing skilled diamond cutters is eliminated, my machine being so constructed and so simple in operation that after the work has been set up the actual cutting may be done by an operator who need have no particular knowledge of the art of diamond cutting.

In the accompanying drawings wherein I have illustrated an embodiment of my invention:

Fig. 2 is a view taken substantially on the line 2—2 of Fig. 1;

Fig. 3 is a view taken substantially on the line 3—3 of Fig. 1;

Fig. 4 is a view on the line 4—4 of Fig. 1;

Fig. 5 is a view on the line 5—5 of Fig. 1;

Fig. 6 is a view on the line 6—6 of Fig. 1;

Fig. 7 is a view on the line 7—7 of Fig. 1;

Fig. 8 is a view on the line 8—8 of Figs. 1 and 3;

Fig. 9 is a view of certain locking mechanism employed in my machine, before the same has been set for operation of the machine;

Fig. 10 is a view similar to Fig. 9 showing the mechanism of Fig. 9 in position for operation of the machine;

Fig. 11 is a fragmentary view of a modification of some of the mechanism illustrated in Fig. 1; and Fig. 12 is a view of a portion of that part of the machine illustrated in Fig. 10, showing a weight as motive power in place of a spring as illustrated in Fig. 10.

Figure 1:
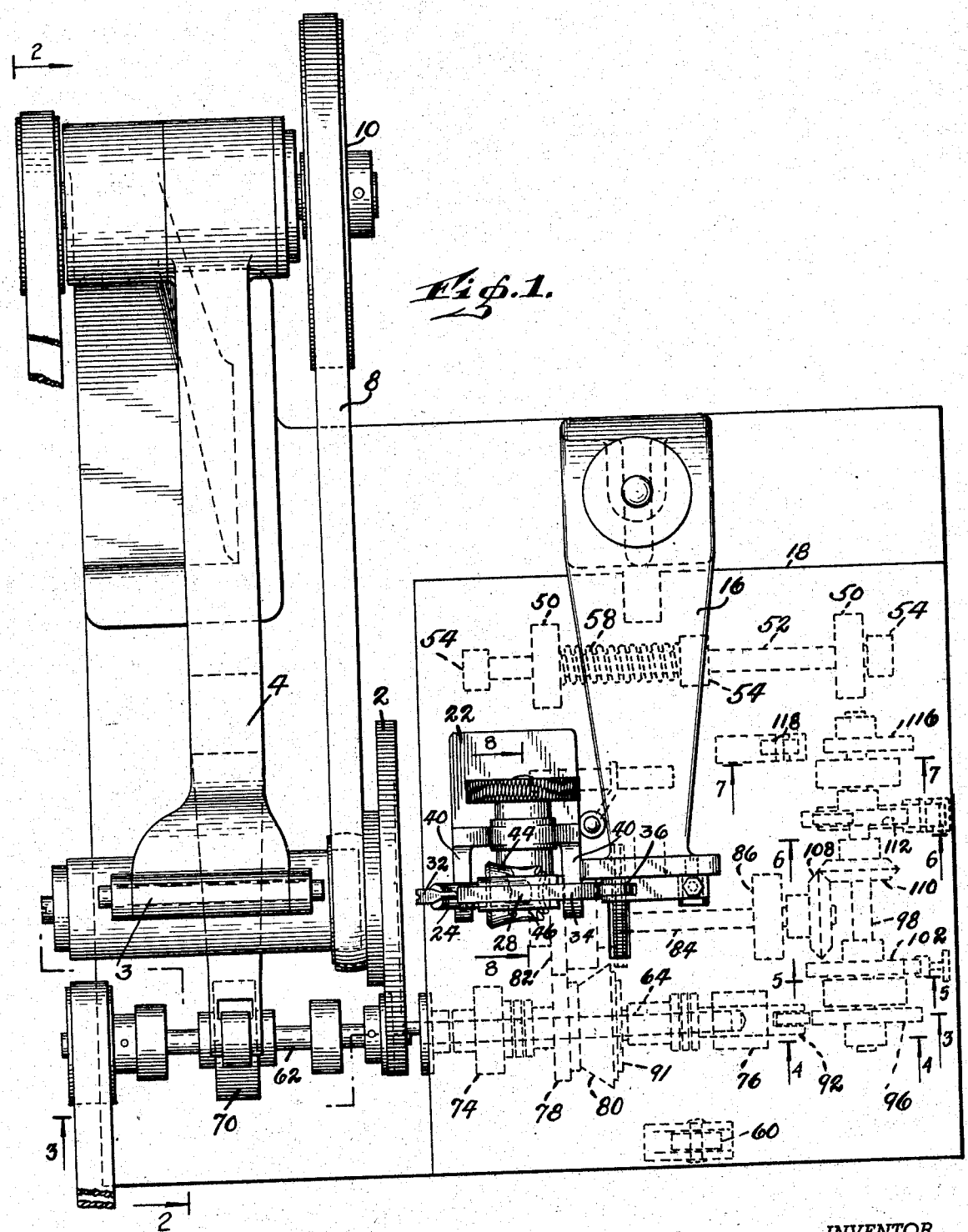
Fig. 1 is a top plan view of the same.

Broadly speaking and before describing my machine in detail, I wish to make it clear that my machine embodies a head or chuck which carries the dop mounting the diamond to be cut. This head is reciprocated automatically toward and away from the cutting wheel, and in addition the dop is rotated intermittently to present a new face of the diamond to the cutting wheel each time the diamond is brought into position to be cut. The machine, it is to be understood, can be made to cut any desired number of facets on the diamond, within the limits permitted by the structure of the diamond, all of which will be understood by a diamond cutter, but for purposes of illustration and clarity of description I have shown my machine as adapted for the cutting of four facets.

So far as the present invention is concerned I may employ an ordinary rotatable cutting wheel, although I have illustrated and shall describe an improved form of construction in this connection.

It will be seen upon reference to the drawings that 2 designates the cutting wheel which is pivotally mounted as shown at 3 on the free end of an arm 4 for rotation on a horizontal axis, the other end of this arm being pivoted on a rigid mount 6. The wheel may be belt driven through belt 8 and pulley 10. The latter may be driven from any suitable motor (not shown).

By mounting the wheel 2 in pivotal bearings as above described the tension of the belt 8 is readily regulated by adjusting bolt 12.

The purpose of pivoting the arm 4 which carries the wheel is to provide for a slight reciprocation of the wheel in a vertical plane when the diamond being cut is in contact with the face of the wheel. I shall refer to this feature in detail later on.

14 designates a mounting bracket at one side of the wheel 2, equipped with an arm 16 which overhangs a cover plate or carriage 18. A great deal of the mechanism of the machine is supported on hangers on the lower or underside of this carriage or cover plate, as will be brought out hereinafter. The carriage 18 is hinged at 20 so that by swinging the arm 16 to one side the carriage or cover plate may be raised to expose the driving mechanism for the machine.

Disposed on the upper face of the carriage or plate 18 is a mounting bracket 22, and pivoted on this mounting bracket adjacent its upper end is chuck 24 for the diamond dop 26. The chuck 24 not only has pivotal movement but is rotated intermittently to present various parts of the diamond to the face of the cutting wheel. On bracket 22 above chuck 24 is a spring loaded steadying lever 28. This lever is pivoted at 30. Removably mounted in the forward end of this lever is a bifurcated arm 32 which is adapted to bear upon and steady the diamond dop during the cutting operation.

The rear end or tail of the steadying lever 28 has a cam face 34 which is adapted to cooperate with cam follower roller 36 mounted on the inner end of the arm 16 already referred to.

The chuck 24 for the diamond dop and the steadying or backing lever 28 are reciprocated in a horizontal plane toward and away from the cutting wheel 2, as will appear hereinafter, and the cam surface 34 on the backing lever is so shaped that when the dop is in diamond cutting position the bifurcated arm 32 will bear against the dop under the action of spring 38, the arm 32 being cammed out of contact with the dop when the parts are retracted or moved from left to right, as viewed in Fig. 3, for example.

The bracket 22 which mounts the dop chuck 24 is provided with bearings 40 for shaft 42 upon which is mounted one element 44 of a Geneva gear train, the other element 46 of this train being affixed to the chuck 24 which mounts the diamond dop. It is to be noted that the Geneva gear train, contrary to standard practice, is so constructed and arranged that the two elements 44 and 46 thereof may be rotated at any desired angle relatively to each other. In the instant machine this permits the chuck 24 to be shifted on its pivot without disturbing the driving connection between the elements 44 and 46 of the Geneva gearing.

The shaft 42 projects at its rear end through the bearing 40 and on this projecting end is mounted a sprocket wheel 48.

I have mentioned above that the carriage or cover plate 18 is hinged at 20, in addition this member has a reciprocating motion toward and away from the cutting wheel 2. In this connection it will be seen from the drawings that the carriage adjacent its rear edge (see for example Fig. 1) is provided on its underside or face with a pair of lugs 50. The pintle 52 for the hinge of the plate passes through these lugs as well as through brackets 54 which are mounted on the bed plate 56 of the machine. Mounted on the pintle 52, intermediate one of the lugs 50 and adjacent bracket 54, is driving spring 58. This spring drives the carriage 18 toward the cutting wheel 2, along with all of the mechanism carried thereby. To facilitate this movement I provide a roller 60 adjacent the edge of the carriage opposite the hinge.

The main drive shaft of the machine is made in two sections 62 and 64 coupled by pin coupling 66 so that the two sections may not only rotate as a unit but section 64 may be moved axially relatively to section 62.

The section 62 is mounted in bearings 68 and may be belt driven from any suitable source of power. This section of the drive shaft is provided with a four sided cam 70 which is fixed to the shaft and cooperates with cam follower arm 72 which is affixed to the arm 4 which mounts the cutting wheel. The shaft section 62 rotates constantly when the machine is in operation, so that the cam 70 will cause the cutting wheel 2 to be reciprocated vertically. Consequently when the diamond is in contact with the wheel there will be the reciprocating action of the wheel as well as rotation of the wheel relatively to the diamond to effect the desired cutting action.

The drive shaft section 64 is mounted in hangers 74 and 76 secured to the underside of the carriage plate 18. Freely mounted on this shaft section are gear 78 and the female member 80 of a friction clutch of the cone type. These two members are rigidly secured to each other. The gear 78 meshes with a gear 82 mounted on a shaft 84 carried in hangers 86 secured to the underside of the carriage or cover plate 18. Affixed to the stub shaft 84 is a sprocket 88 for sprocket chain 90 which also runs over the sprocket 48 fixed to the shaft 42 carrying the Geneva gear member 44. As a result of this construction rotation of the gear 78 will rotate the Geneva gear member 44 to effect intermittent rotation of the diamond dop.

Keyed to the drive shaft section 64 is the male member 91 of the cone clutch. The rear bearing for the drive shaft section 64 in the hanger 76 takes the form of a sleeve 92 which has axial movement in the hanger. This sleeve projects beyond the hanger and carries cam follower roller 94 cooperating with driven cam 96. This cam through the sleeve 92 is adapted to engage the clutch members 90 and 80.

98 designates a shaft which is supported in hangers 100 secured to the underside of the carriage 18. The shaft 98 extends at right angles to the drive shaft section 64, transversely of the machine, and the clutch actuating cam 96 is fixedly mounted on this shaft.

Fixed to the shaft 98 is locking cam 102 cooperating with pawl 104 at predetermined intervals, the latter being pivoted at 106 to the lower face of the carriage 18.

The shaft 84 carrying the gear 82 which meshes with the gear 78 on drive shaft section 64 carries at its extreme outer end a bevel gear 108 meshing with gear 110 on the shaft 98, to drive the latter.

The shaft 98 also carries a shaft actuating cam 112 illustrated in Fig. 6, and cooperating with spring loaded cam follower roller 114 which is carried by the carriage 18.

Finally the shaft 98 carries a retracting cam 116 cooperating with cam follower roller 118 mounted on a bracket 120 on the fixed bedplate 56 of the machine.

Mounted in fixed bearings beneath the carriage 18 on a stub shaft 122 are two ratchets 124 and 126. The ratchet 124 cooperates with a spring loaded pawl 128 mounted on the machine bedplate 56. The ratchet 126 cooperates with spring loaded stop pawl 130 carried on the underside of carriage 18. The stop pawl 130 has a rearwardly extending tail 132 adapted to be depressed by a pin 134 to move the pawl out of operative position. This pin 134 projects upwardly through the carriage 18 so as to be accessible from the exterior thereof. The pin 134 carries a lug or projection 135 which directly engages tail 132. The lower end of the pin is in engagement with the pawl 128. By depressing the pin the two pawls 128 and 130 can be moved out of locking engagement with their respective ratchets.

The shaft 122 mounting the ratchets 124 and 126 is provided with a tension spring 136 coiled about the shaft and having one end secured thereto. The other end of the spring is anchored as seen at 138. Rotation of the shaft 122 anti-clockwise, as viewed in Fig. 9, places the spring under tension.

The periphery of the ratchet 124 is cut away as shown at 140 and a fixed stop pin 142 which lies parallel to shaft 122 extends into this cutout. As a consequence rotation of the ratchets 124 and 126 is limited by this pin to the range of movement illustrated in Figs. 9 and 10, namely, to the length of the cutout 140.

The operation of my improved machine is as follows: Assuming that the dop 26 carrying a diamond to be cut has been placed in the chuck 24. Assuming also that the parts are all in the position shown in the drawings except for the showing in Figs. 10 and 11: It will be seen from Fig. 9 that the ratchets 124 and 126 are in such position that the spring 136 is under its maximum tension; it will be understood also that inasmuch as the carriage of the machine is in its fully retracted position that the driving spring 58 is under compression.

The operator first depresses the rod 134, to allow the ratchets 124 and 126 to rotate under the action of spring 136 from the position shown in Fig. 9 to that shown in Fig. 10, namely, to the extent permitted by the fixed stop pin 142. Prior to this depression of the rod 134 the spring 58 was held under compression by the pin 142 preventing rotation of locking ratchet 126.

Although the motors for driving the cutting wheel 2 and the drive shaft sections 62 and 64 are running, shaft 98 carrying the cams 96, 102, 112 and 116 cannot rotate prior to actuation of the rod 134, being positively held against rotation at this time because the cam 102 is in engagement with locking pawl 104. However, when the operator depresses the pin or rod 134 as above mentioned, the carriage 18 is moved under the impulse of spring 58, and the pawl 104 (see Fig. 5) bearing against the striker bracket which is carried by the fixed bedplate 56 is swung out of engagement with the cam 102 and the shaft 98 is given a partial turn by the cam 112 through the action of the spring 113 which cooperates with this cam. The impulse given to the shaft 98 by this spring is sufficient to rotate the cam 96 so that the dwell on the face thereof will be moved out of engagement with cam follower roller 94 and the active part of the cam will engage the roller to push the sleeve 92 to the left, as viewed in Fig. 3, to engage clutch member 91 with the clutch member 80, and inasmuch as the clutch member 91 is keyed to the rotating shaft section 64 the shaft 98 and all of the cams carried thereby will rotate.

It will be appreciated, of course, that the various operations just described take place substantially simultaneously with the depression of the rod 134. The spring 58 being under compression the carriage will be moved forward to bring the diamond against the cutting wheel 2. It will be appreciated that in this forward movement of plate or carriage 18 the ratchets will be rotated to the left to a distance equal to the forward travel of the carriage due to engagement of the pawl 130 with ratchet 126.

By the time the carriage has reached the end of its forward movement the shaft 98 has rotated sufficiently to bring retracting cam 116 into the dotted line position of Fig. 7, and inasmuch as this cam is rotating clockwise its engagement with fixed cam follower roller 118 will move the machine carriage rearwardly. On this rearward movement the pawl 128 will have engaged the next notch in periphery of cam 124 from that shown in Fig. 10 so as to begin placing spring 136 under tension. This rearward movement of the carriage 18 continues until cam 116 has rotated to bring the flattened face thereof into engagement with roller 118 to permit the carriage to move forward again.

During this time the clutch has been engaged so that the Geneva gear train connected to the diamond dop chuck is in operation so that on the second forward movement of the carriage the diamond will have been turned 90° so as to present a new face to the cutting wheel.

These operations are repeated until, in the design shown, four facets have been cut. On the last rearward movement of the carriage, that is, following the cutting of the fourth facet, the ratchets 124 and 126 will have been returned to initial position, that is, to the position shown in Fig. 9. In fact, all parts will have returned to the positions shown in the drawings Figs. 1 to 9.

A new dop may then be placed in the machine and the same cycle gone through again.

The showing in Fig. 11 is quite diagrammatic and merely illustrates the arrangement of the dop chuck when the facets at the other face of the diamond are to be cut. It is necessary under these conditions to tip the chuck from the position shown in Fig. 3 to that shown in Fig. 11, and in order that I may utilize the rest of the machine, I provide a bevel gear $a$ on the shaft 42 carrying the member 44 of the Geneva gear train, and instead of mounting sprocket 48 on this same shaft 42 I mount it on a separate shaft, which is also provided with a bevel gear $b$ meshing with the gear $a$. In this embodiment of my invention the Geneva gearing is left unchanged, and the angularity of the chuck 24 may be changed without disturbing the driving connection between the two elements of the Geneva gearing.

In the embodiment of my invention illustrated in Fig. 12 I have simply substituted a weight 150 for the spring 58, shown, for example, in Fig. 10. The weight is suspended over a pulley 152 by a cord 154, the free end of which will be secured to the lug 50 secured to the underside of the carriage 18.

It will be seen from all of the foregoing that I have provided a machine for cutting diamonds wherein the necessity for the services of a skilled diamond cutter are dispensed with. The machine, after it has been set up, is automatic in operation so that it may be operated by unskilled labor. It will be appreciated also that my machine inherently is rapid in operation so that its capacity far exceeds the ordinary hand cutting methods.

It is to be appreciated that changes may be made in the details of construction and arrangement of parts herein illustrated and described within the purview of my invention.

What I claim is:

1. A diamond cutting machine comprising in combination a diamond dop, a carriage for the same, means for reciprocating the carriage to bring a diamond carried by the dop into and out of operative position relatively to a cutting wheel, a backing lever for the dop carried by said carriage to prevent deflection of the dop when the diamond is in engagement with the cutting wheel, a cam surface on said lever, a spring for said lever for pivoting the lever into operative position relative to the dop on forward movement of said carriage, and a fixed roller engaging the cam surface of the lever to pivot the lever out of operative position as said carriage is retracted.

2. A diamond cutting machine comprising in combination a diamond dop, a carriage for the same, means for reciprocating the carriage to bring a diamond carried by the dop into and out of operative position relatively to a cutting wheel, a backing lever for the dop, a spring for actuating the lever into operative position as the diamond dop moves toward the cutting wheel, and a cam for moving the lever out of operative position as the said carriage is retracted.

3. A diamond cutting machine comprising in combination a carriage, means for mounting a diamond dop thereon, means for moving the carriage and dop into operative position relatively to a cutting wheel, a sectional drive shaft, a clutch for clutching the two sections of said shaft, a cam shaft driven by said drive shaft, a cam carried by said cam shaft for engaging said clutch, a fixed abutment, and a second cam carried by said cam shaft engaging said abutment to effect retraction of said carriage.

4. A diamond cutting machine comprising in combination a carriage, means for mounting a diamond dop thereon, a spring for moving the carriage and dop into operative position relatively to a cutting wheel, a sectional drive shaft, a clutch for clutching the two sections of said shaft, a cam shaft driven by said drive shaft, a cam carried by said cam shaft for engaging said clutch, a fixed abutment, and a second cam carried by said cam shaft engaging said abutment to effect retraction of said carriage against the action of said spring.

5. A diamond cutting machine comprising in combination a carriage, means for mounting a diamond dop thereon, a weight for moving the carriage and dop into operative position relatively to a cutting wheel, a sectional drive shaft, a clutch for clutching the two sections of said shaft, a cam shaft driven by said drive shaft, a cam carried by said cam shaft for engaging said clutch, a fixed abutment, and a second cam carried by said cam shaft and engaging said abutment to effect retraction of said carriage against the action of said weight.

6. A diamond cutting machine comprising in combination a carriage, a diamond dop carried thereby, means for moving said carriage forward to bring said dop into operative position relatively to a cutting wheel, a sectional drive shaft, a friction clutch for clutching said shaft sections, a spring actuated rotatable cam, a lock for holding said cam against rotation, said cam being unlocked by forward movement of said carriage, to engage said friction clutch.

7. A diamond cutting machine comprising in combination a carriage, a diamond dop carried thereby, a spring for moving said carriage forward to bring said dop into operative position relatively to a cutting wheel, a sectional drive shaft, a friction clutch for clutching said shaft section, a cam shaft driven by said drive shaft, a spring actuated cam on said shaft, a second cam on said cam shaft, and a lock for the spring actuated cam released upon forward movement of said carriage whereby movement will be effected of the second cam to engage said clutch.

8. A diamond cutting machine comprising in combination a carriage, driving means therefor to reciprocate the carriage into and out of operative position relatively to a cutting wheel, a sectional drive shaft, means for constantly driving one of said shaft sections, a friction clutch member and a gear freely mounted on the other of said shaft sections, said clutch member and gear being rigid with each other, a diamond dop carried by the carriage, a Geneva drive between said gear and dop, a friction clutch member rigidly connected with the other section of said drive shaft, and means for moving said other shaft section endwise to engage said clutch members and effect operation of the Geneva drive to present a new face of the diamond to the cutting wheel each time said carriage is moved forward.

9. A diamond cutting machine comprising in combination a carriage, driving means therefor to reciprocate the carriage into and out of operative position relatively to a cutting wheel, a sectional drive shaft, means for constantly driving one of said shaft sections, a frictional clutch member and a gear rigid therewith loosely mounted on the other of said shaft sections, a diamond dop carried by the carriage, a Geneva drive, the co-operating elements of which are operable at various angles relatively to each other between said gear and dop, a friction clutch member rigidly connected to said other shaft section, and means for effecting endwise movement of said other shaft section to engage said clutch members and effect operation of said Geneva drive.

10. A diamond cutting machine comprising in combination a carriage, a diamond dop mounted thereon, means for actuating the carriage toward a cutting wheel, driving mechanism for driving the carriage in the opposite direction a sectional drive shaft, means for constantly driving one section of said shaft, a friction clutch, one element of which is freely mounted on the constantly driven shaft section, the other element of the clutch being rigidly mounted on the other drive shaft section, and a spring actuated cam for moving said other drive shaft section endwise to engage said clutch elements after the release of said actuating means.

11. A diamond cutting machine comprising in combination a carriage, a diamond dop chuck carried thereby, means for actuating the carriage toward a cutting wheel, retracting mechanism for driving the carriage in the opposite direction including a friction clutch, a drive shaft on which the two elements of said clutch are mounted, one of said elements being free on the shaft and the other fast on the shaft, and a cam which is spring actuated for moving the last mentioned clutch element into clutching position after the release of said actuating means.

JOHN W. RADU.